March 27, 1956 L. C. JESTY 2,740,065

CATHODE RAY DISPLAY TUBES

Filed Feb. 25, 1952

Inventor:
Leslie Connock Jesty;
By his attorneys,
Baldwin & Wight

United States Patent Office 2,740,065

Patented Mar. 27, 1956

2,740,065

CATHODE RAY DISPLAY TUBES

Leslie Connock Jesty, Burnham-on-Crouch, England, assignor to Marconi's Wireless Telegraph Company Limited, London, England, a company of Great Britain Application February 25, 1952, Serial No. 273,196

Claims priority, application Great Britain March 2, 1951

4 Claims. (Cl. 313—92)

This invention relates to cathode ray display tubes i. e. to cathode ray tubes such as are employed for picture reproduction in television reception, display purposes in radar systems and in other cases where a scanning cathode ray beam is employed to build up a visible picture or display.

There are many cases in which it is very important that the individual parts of the picture or display built up on the screen of a cathode ray display tube shall occur very accurately at their correct positions. Thus, for example, in certain color television systems it is required to superimpose differently colored pictures e. g. red, green and blue images, on the screen and, to obtain satisfactory results, all parts of the superimposed images must be positioned with great precision. Again in certain stereoscopic television systems in which "left eye" and "right eye" images must be superimposed the same requirement arises. Yet again, in certain radar systems employing displays of the P. P. I. type the picture or pattern produced from echo signals is required to be presented in superimposition upon reference lines or chart representations and here too, a high degree of position accuracy is necessary as respects all parts of the picture or pattern. For all these and other cases in which precise positioning is required the normal television practice of merely synchronizing the reproduced picture by line and field synchronizing signals only and the corresponding normal radar (P. P. I.) practice as regards synchronization are not sufficient to secure the required accurate registration of the picture. The present invention seeks to provide improved cathode ray tubes which, in use, will automatically provide signals, very closely spaced in time, which can be used to provide the required high precision of scanning registration.

According to this invention the screen structure of a cathode ray display tube is provided with a grid or pattern of discontinuities adapted when scanned by the scanning cathode ray beam of the tube to provide signals (hereinafter termed "register signals") which occur when said beam strikes the elements of said grid or pattern. These signals are utilizable, in co-operation with synchronizing signals included in the signal wave fed to the tube, to ensure very precise registration of the picture reproduced.

The discontinuities may be constituted by the parts of a grid or pattern of fluorescent material. The said parts when struck by the cathode ray beam in scanning give out light which, picked up by a photo-cell, give rise to the required register signal. In the case of a tube having an aluminized or similar screen, i. e. a screen comprising a very thin layer of metal on the electron gun side of the normal fluorescent layer by which the picture is reproduced, the grid or other pattern of fluorescent material may be provided on the gun side of the metal. Light from this grid or pattern falls upon a photo-electric cell which may be inside the envelope of the tube or accessible, through a suitable transparent window in the wall of said envelope, to light from the said grid. Instead of providing a grid or pattern of fluorescent material on the gun side of the metal the said metal may be cut away in a grid or pattern so as to expose, when viewed from the gun side of the screen, parts of the normally provided fluorescent material on the side of the metal remote from the gun. As before light from these parts is arranged to fall upon a photocell by which the required register signals are generated. The former arrangement, namely that in which there is a separate deposit of fluorescent material on the gun side of the screen, has the advantages that this material may be chosen to have a very small after-glow much smaller than that of the normally provided fluorescent material on the other side of the screen while the photocell is not affected by light from the said normally provided fluorescent material.

In place of using fluorescent material to provide light emission to produce the register signals, the discontinuities may be constituted by means for producing variations in secondary emission. Thus, for example, a tube with an aluminized or similar screen may be provided with a grid or pattern of graphite on the gun side of the screen so that variations in secondary emission would be produced during scanning. In this case there would be provided a suitable secondary electron collecting electrode inside the tube envelope and in association with the screen structure, the required register signals being set up in the collecting electrode circuit.

The shape and arrangement of the grid or pattern depends on requirements. In the case of a television tube it is preferably composed of lines or strips running at right angles to the scanning line direction. In the case of a tube for P. P. I. presentation in a radar system the grid or pattern preferably consists of a number of concentric circles having the point of origin of the radial deflection excursion as a center.

The register signals produced may be used to secure accurate registration in any convenient way. They may, for example, be used to produce suitably shaped pulses which are time or phase compared with other timing pulses contained in the modulation signal (in the case of television, the video and synchronizing signal wave) applied to the control electrode of the gun system of the tube, the time or phase comparison being effected in a comparison circuit of known form adapted to give a D. C. output whose polarity and magnitude depend respectively upon the direction and amount of departure from the co-incidental or in-phase relation. By applying this D. C. output to control the normally provided line deflection source so as to control the speed of deflection to correct for any departure which may occur, the required accurate registration can be obtained.

The present invention may be used in a "color strip screen" color television system (which is not per se part of this invention) wherein use is made of a tube with a screen made up of red, green and blue strips and wherein two photo-electric cells, responsive respectively to red and green light, are used to accelerate or decelerate the scanning line time-base in dependence upon which of them is excited. In a preferred form of this color system alternate blue strips of the screen are replaced by opaque strips i. e. the order of the strips on the screen (seen from the viewer's side) is red, green, blue, red, green, opaque, red, green, blue, red, green, opaque . . . and so on. In one way of applying this invention to such a color system using an aluminized or similar screen, the opaque strips replacing blue strips, are placed on the screen on the viewer's side thereof and the red and green strips at these places are made wider than usual so that they adjoin under the opaque strips. The widths of the strips (including the opaque ones) are made such that, when seen from the viewer's side all the strips, red, green, blue and opaque, are of the same width throughout but, when viewed from the other side those red and green strips which meet under an opaque strip, are each wider than normal by half the width of a strip, the line of junction being symmetrical with respect to the covering opaque strip. The metal on the gun side of the screen is cut away symmetrically about these lines of junction, thus exposing, on the gun side, equal portions of the red and green. These exposed portions have a combined width a little less than that of the opaque strip and the light emitted thereby falls upon one or other of two photo-cells (one for red light and the other for green) utilized to accelerate or decelerate the scanning line time base in any convenient manner known per se. This arrangement has the advantage that the controlling light—i. e. the light which controls the photo-cells and therefore the source of register signals—is not visible from the viewing side of the screen and therefore cannot adversely affect picture contrast.

The invention is illustrated in the accompanying drawings which show, schematically a number of embodiments, and in which.

Figure 4:
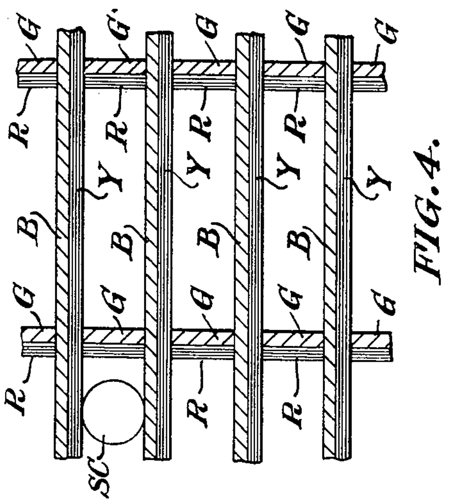
Figure 3:
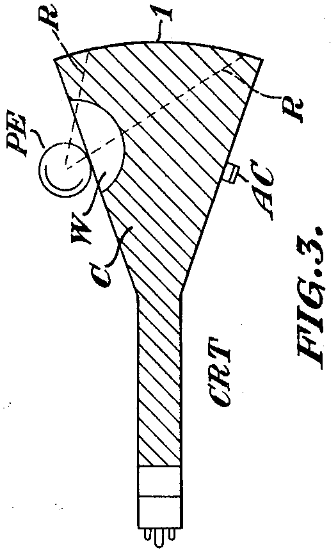
Figure 5:
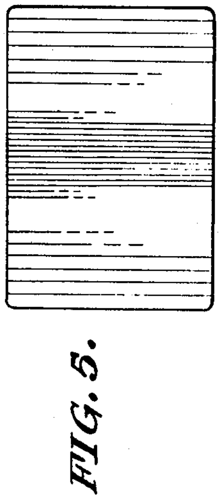

Fig. 3 diagrammatically illustrates a cathode ray tube assembly embodying the principles of my invention;

Fig. 4 shows a fragmentary portion of the screen structure of the cathode ray tube, the view being drawn on a greatly magnified scale; and Fig. 5 shows a further modified form of screen structure embodying my invention.

Figure 1:
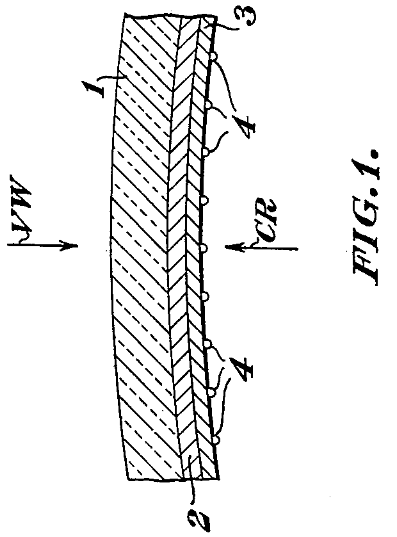
Figure 1 is a fragmentary cross sectional view through the glass end wall of a cathode ray tube constructed in accordance with my invention.

Referring to Fig. 1 a transparent screen support 1, constituted, for example, by the glass end wall of a cathode ray tube or a glass or mica plate suspended inside the bulb of the envelope of the tube, has deposited thereon a layer 2 of fluorescent material which may be of any desired suitable nature, e. g. uniform or made up of color strips or dots in dependence on requirements. On the layer 2 is a thin aluminum film 3 on which in turn is a desired layer 4 in the form of a desired pattern (e. g. of strips or dots) of fluorescent powder or material with different secondary emission coefficient. If a color strip or color dot pattern in layer 2 has to cooperate with one in layer 4 the two patterns are suitably registered in manufacture. In Figure 1 arrow VW represents the viewing direction and arrow CR the incident cathode ray.

In Figure 2, 1 is again the glass or other support and the fluorescent layer 2 is represented as formed in colored strips indicated by the letters G, B, and R (green, blue and red). The aluminum layer 4 is cut away in strips as at 4*a* at the green-red junctions and between each gap, on the viewing side of layer 2 is an opaque strip 5. Because of the presence of the opaque strips 5 the red and green strips adjacent each of said strips 5 are made wider than the color strips elsewhere and of sufficient extra width to make all the color strips appear of uniform width when seen from the viewing side i. e. of sufficient extra width to compensate for the masking by the opaque strips.

Figure 2:
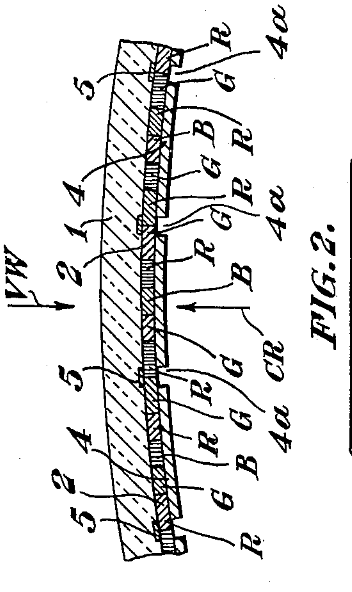
Fig. 2 is a view similar to Fig. 1, illustrating another form of screen structure embodying my invention.

Fig. 3 shows diagrammatically a form of tube in accordance with the invention and having a window to enable external photo cells to be used to "see" a grid or pattern of discontinuities on the back (i. e. on the gun side) of the fluorescent screen. The screen or pattern, which does not appear in Figure 3 may be for example as represented in Figs. 1 or 2 or in Figs. 4 or 5 to be described hereinafter. It is on the inside of the glass end wall 1 of the tube, which is generally designated C. R. T. and is of the type having the customary deposited metallic coating on the interior wall of the envelope. This coating is marked C and is indicated by shading. A window W is formed in this coating so as to allow light to follow paths such as the paths R from the screen or pattern to the photo-electric cells one of which appears at P. E. The normal anode connection terminal of the tube is represented at A. C.

Fig. 5 shows a form of screen for use in the "color strip screen" color system above mentioned to give control in one direction of scanning only, i. e. the line direction. If desired, however, the arrangement may be made such as to give control in two directions. For example, where spiral scanning is used the two directions would be radial and circumferential. Where scanning in mutually perpendicular directions (the usual television case) is used the two directions would be mutually perpendicular, i. e. in the line and framing directions. Fig. 4 is a face view of part of a grid or pattern provided in accordance with this invention and capable of being used for control in both the line and the framing direction. One pair of colors give control in one direction and another pair give control in the other. As represented in Fig. 4 one pair is red and green and the other is blue and yellow. As will be seen the grid consists of colored strips of fluorescent material, comprising red and green strips R and G running one way and blue and yellow strips B and Y running perpendicularly and arranged as shown. As will be appreciated these strips are deposited on the electron gun side of an aluminum layer on the inside of the end wall of the tube as in Figs. 1 and 2. The scanning spot is represented in Fig. 4 by a circle SC and moves in the scanning line direction.

To use this tube for control in both directions a pair of photo-cells respectively sensitive to red and green is provided for the horizontal deflection control and a further pair respectively sensitive to blue and yellow is provided for the vertical deflection control. With the screen represented in Fig. 4 if, at the moment of arrival of a "blue dot" synchronizing pulse, the red sensitive cell receives more light than the green sensitive one, this is because scanning is too slow and control action is applied to speed up the scanning in the horizontal direction. Similarly if green predominates the cells operate to slow down the scanning. Similarly the red and yellow cells are arranged to control the vertical deflection, an excess of yellow, at the moment of arrival of a "blue dot" synchronizing pulse shifting the spot down and an excess of blue shifting it up.

The spacing of the strips of a grid or pattern provided in accordance with this invention need not be uniform and both in the case of a camera tube target or a receiver tube screen a wider spacing may be used towards the edges than at the center. It is considered quite tolerable to increase the spacing to about twice at the edges as compared to that at the center. Fig. 5 represents such increasing of spacing of the strips of a grid which is represented as having strips in one direction only. To simplify Fig. 5 it is made purely diagrammatic with the strips represented by simple lines and only a few representative ones shown.

I claim:

1. A cathode ray display tube having a screen structure of the metallized type and having a gun side and a viewing side, the metal of the screen being arranged on the gun side of said structure and being constituted as a pattern of spaced metal strips, and opaque strips being arranged on the viewing side of said structure to coincide with the spaces between said metal strips on the gun side.

2. A cathode ray display tube as set forth in claim 1 in which the spaces between the metal strips are arranged so as to expose, when viewed from the gun side of the screen structure, parts of the normally provided fluorescent material on the side of the metal strips remote from the gun side.

3. A cathode ray display tube as set forth in claim 1 and wherein the pattern includes a number of concentric circles.

4. A cathode ray display tube having a screen structure of the metallized type and having a gun side and a viewing side, the metal of the screen being arranged on the gun side, and being constituted as a pattern of spaced metal strips, and opaque strips being arranged on the viewing side of said structure to coincide with the spaces between the metal strips on the gun side, and wherein the spaces between the metal strips are of smaller width at the middle of the pattern than elsewhere.

References Cited in the file of this patent

UNITED STATES PATENTS

| | | |
|---|---|---|
| 2,250,528 | Gray | July 29, 1941 |
| 2,343,825 | Wilson | Mar. 7, 1944 |
| 2,415,059 | Zworykin | Jan. 28, 1947 |
| 2,416,056 | Kallmann | Feb. 18, 1947 |
| 2,446,440 | Swedlund | Aug. 3, 1948 |
| 2,463,535 | Hecht | Mar. 8, 1949 |
| 2,481,839 | Goldsmith | Sept. 13, 1949 |
| 2,540,635 | Steier | Feb. 6, 1951 |
| 2,602,145 | Law | July 1, 1952 |
| 2,606,303 | Bramley | Aug. 5, 1952 |
| 2,630,548 | Muller | Mar. 3, 1953 |
| 2,631,259 | Nicoll | Mar. 10, 1953 |
| 2,633,547 | Law | Mar. 31, 1953 |
| 2,657,331 | Parker | Oct. 27, 1953 |
| 2,689,927 | Bradley | Sept. 21, 1954 |